(No Model.)

H. C. STAHL & J. C. ROSEBAUGH.
VEHICLE WHEEL.

No. 334,301. Patented Jan. 12, 1886.

Witnesses:
B. L. Beer
O. A. Clark

Inventors,
Harlow C. Stahl
and John C. Rosebaugh
By Paine & Ladd,
Atty's.

United States Patent Office.

HARLOW C. STAHL AND JOHN C. ROSEBAUGH, OF FREMONT, OHIO, ASSIGNORS TO THE FREMONT CULTIVATOR COMPANY, OF SAME PLACE.

VEHICLE-WHEEL.

SPECIFICATION forming part of Letters Patent No. 334,301, dated January 12, 1886.

Application filed November 25, 1885. Serial No. 183,978. (No model.)

*To all whom it may concern:*

Be it known that we, HARLOW C. STAHL and JOHN C. ROSEBAUGH, citizens of the United States, residing at Fremont, in the county of Sandusky and State of Ohio, have invented certain new and useful Improvements in Vehicle-Wheels; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to vehicle-wheels and to wheels for cultivators and other farm implements where strength and lightness are essential.

This invention consists in the detailed construction and combination of the parts hereinafter fully described and claimed, whereby the cost of construction is reduced and the adjustment of the various parts facilitated, and a wheel combining an attractive appearance with lightness and strength is produced.

Figure 1:
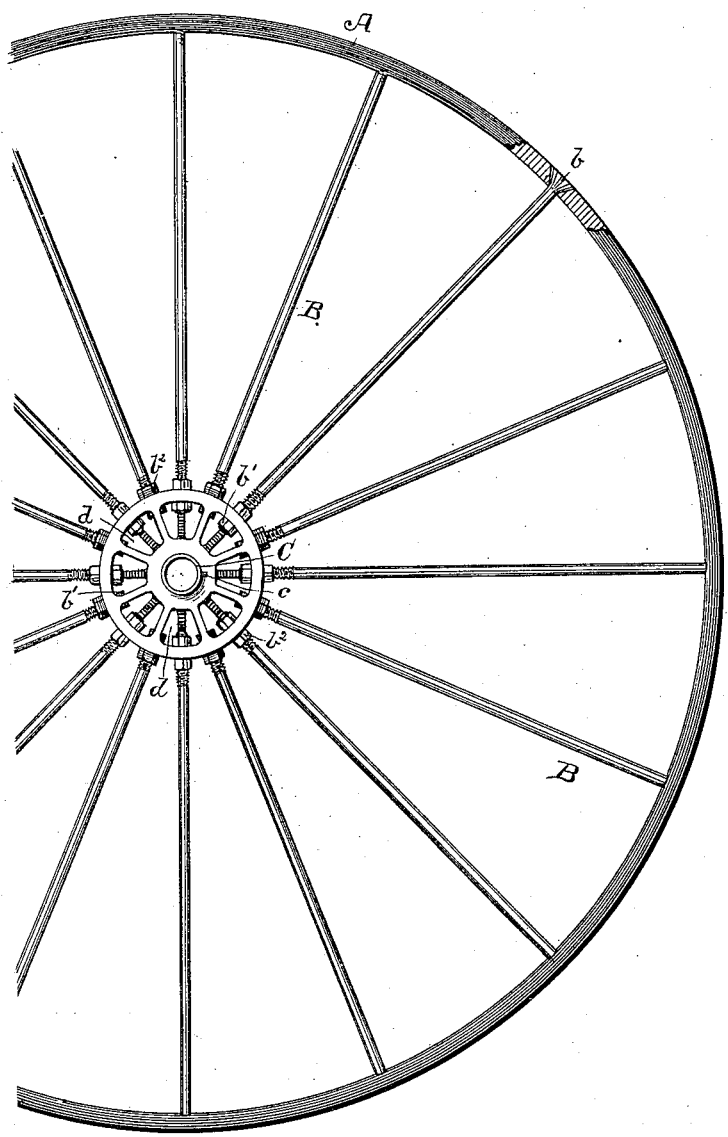
Figure 2:
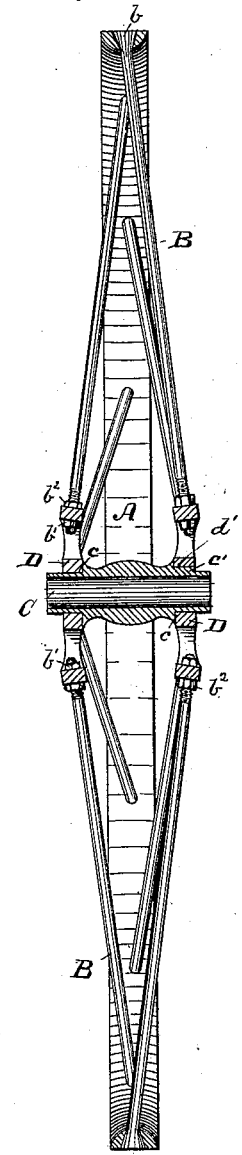

In the drawings, Figure 1 is a side view of the wheel. Fig. 2 is a transverse section taken on the line $x\,x$ in Fig. 1.

The tire A of the wheel is made of half-oval iron, so as to shed sand and dirt.

B are the spokes, provided at one end with a conical head, $b$, which fits into a corresponding conical hole countersunk into the tire, and at the opposite end each spoke is screw-threaded and provided with the nut $b'$, for adjusting the tension, and with the locking-nut $b^2$. The spokes alternate with the hub-flanges, adjacent spokes being attached to opposite ends of the hub. On large wheels which have but little spring the lock-nuts $b^3$ may be dispensed with.

C is the hub of the wheel, provided with a central smooth-bore hole for the end of the axle. Shoulders $c$ are formed upon the outside of the hub to prevent the flanges D from being drawn inward by the tension of the spokes, and lugs $c'$, cast integral with the hub, project therefrom into notches formed in the said flanges. The flanges D are cast with radial arms, connecting the rim with the hub portion thereof, open spaces $d$ being thus formed in them, each flange being cast with its rim, radial arms, and hub portion integral. These openings correspond with the spokes, and there is a hole for a spoke in the rim of the flange at the center of each open space, and the ends of the spokes project centrally into the same.

The locking-nuts $b^2$ are tightened down upon the outside circumferences of the flanges when the tension of the spokes has been adjusted. The spokes alternate with the flanges, adjacent spokes being attached to the opposite flanges. Notches $d'$ are formed in the flanges for the lugs $c'$ of the hub to project into. These lugs prevent the flanges from turning round. On small-sized wheels these lugs and notches may be dispensed with, the friction of the flanges when driven tightly over the ends of the hub being sufficient to retain them in position.

Having thus described our invention, what we claim as new, and desire to secure by Letters Patent, is—

1. In a vehicle-wheel, the combination of a tire having conical holes countersunk therein, a series of spokes having a conical head, $b$, at one end and a screw-threaded portion having nuts $b'$ and $b^2$ at the other, a central hub provided with shoulders $c$, and the flanges D on the said hub, each cast with the rim, radial arms, and hub portion integral, forming the openings, and provided with the holes in the rim for the ends of the spokes corresponding with the several openings, $d$, substantially as and for the purpose set forth.

2. In a vehicle-wheel, the combination of a tire having conical holes countersunk therein, a series of spokes having a conical head, $b$, at one end and a screw-threaded portion having nuts $b'$ and $b^2$ at the other, a central hub provided with shoulders $c$ and projecting lugs $c'$, and the flanges D, each cast with the rim, radial arms, and hub portion integral, forming the openings, and provided with the holes in the rim for the ends of the spokes corresponding with the several openings, and the notches $d'$, engaging with the said projecting lugs, substantially as and for the purpose set forth.

In testimony whereof we affix our signatures in presence of two witnesses.

HARLOW C. STAHL.
JOHN C. ROSEBAUGH.

Witnesses:
E. LOUDENSLEGER,
I. T. MILLER.